United States Patent
Chang

(10) Patent No.: US 10,532,670 B2
(45) Date of Patent: Jan. 14, 2020

(54) SEAT RECLINER FOR VEHICLE

(71) Applicant: HYUNDAI DYMOS INCORPORATED, Seosan-si, Chungcheongnam-do (KR)

(72) Inventor: Seung Hun Chang, Hwaseong-si (KR)

(73) Assignee: Hyundai Dymos Incorporated, Seosan-si, Chungcheongnam-do (KR)

( * ) Notice: Subject to any disclaimer, the term of this patent is extended or adjusted under 35 U.S.C. 154(b) by 0 days.

(21) Appl. No.: 15/981,428

(22) Filed: May 16, 2018

(65) Prior Publication Data

US 2019/0193602 A1 Jun. 27, 2019

(30) Foreign Application Priority Data

Dec. 26, 2017 (KR) .................. 10-2017-0180245

(51) Int. Cl.
*B60N 2/23* (2006.01)
*B60N 2/235* (2006.01)

(52) U.S. Cl.
CPC .................. *B60N 2/236* (2015.04)

(58) Field of Classification Search
CPC .................................................. B60N 2/236
See application file for complete search history.

(56) References Cited

U.S. PATENT DOCUMENTS

| | | | | |
|---|---|---|---|---|
| 5,681,086 A * | 10/1997 | Baloche | .............. | B60N 2/236 297/354.12 |
| 2002/0171280 A1* | 11/2002 | Okazaki | .............. | B60N 2/2356 297/367 R |
| 2011/0169314 A1* | 7/2011 | Tanguy | .............. | B60N 2/236 297/367 P |
| 2017/0253151 A1* | 9/2017 | Maeda | .............. | B60N 2/20 |
| 2017/0253152 A1* | 9/2017 | Maeda | .............. | B60N 2/236 |
| 2018/0043800 A1* | 2/2018 | Maeda | .............. | B60N 2/236 |
| 2018/0162239 A1* | 6/2018 | Smuk | .............. | B60N 2/235 |

FOREIGN PATENT DOCUMENTS

| | | | | | |
|---|---|---|---|---|---|
| DE | 102009032750 A1 | * | 1/2011 | ............ | B60N 2/236 |
| DE | 102010010923 A1 | * | 9/2011 | ............ | B60N 2/236 |
| DE | 102010010925 A1 | * | 9/2011 | ............ | B60N 2/236 |
| FR | 2883523 A1 | * | 9/2006 | ............ | B60N 2/235 |
| FR | 2884191 A1 | * | 10/2006 | ............ | B60N 2/236 |

(Continued)

OTHER PUBLICATIONS

Office Action of corresponding Korean Patent Application No. 10-2017-0180245—4 pages (Dec. 19, 2018).

*Primary Examiner* — Timothy J Brindley
(74) *Attorney, Agent, or Firm* — Knobbe Martens Olson & Bear LLP

(57) ABSTRACT

Disclosed is a seat recliner for a vehicle, the seat recliner including: a first flange provided with a plurality of guide parts being spaced apart from each other, with guide spaces defined between the guide parts; a plurality of locking gears disposed in the guide spaces of the first flange respectively, configured to slide forward and backward along the guide parts in a radial direction, and provided with external teeth at an outer end of each of the locking gears; and a second flange coupled with the first flange to be rotatable relative thereto, formed in a shape covering the guide parts and the locking gears, and configured to be engaged with the external teeth of the locking gears.

11 Claims, 5 Drawing Sheets

(56) References Cited

FOREIGN PATENT DOCUMENTS

| FR | 2956623 A1 | * | 8/2011 | ............. B60N 2/236 |
|----|------------|---|--------|--------------------------|
| JP | 2004-121508 A | | 4/2004 | |
| KR | 10-1725412 B1 | | 4/2017 | |
| WO | WO-2004043733 A1 | * | 5/2004 | ........... B60N 2/2356 |
| WO | WO-2010048383 A1 | * | 4/2010 | ............. B60N 2/236 |
| WO | WO-2010101569 A1 | * | 9/2010 | ........... B60N 2/2356 |
| WO | WO-2013026338 A1 | * | 2/2013 | ........... B60N 2/2356 |
| WO | WO-2013133615 A1 | * | 9/2013 | ........... B60N 2/2356 |
| WO | WO-2016129423 A1 | * | 8/2016 | ............. B60N 2/236 |

* cited by examiner

SEAT RECLINER FOR VEHICLE

CROSS REFERENCE TO RELATED APPLICATION

The present application claims priority to Korean Patent Application No. 10-2017-0180245, filed Dec. 26, 2017, the entire contents of which is incorporated herein for all purposes by this reference.

BACKGROUND

Field

The present disclosure relates to a seat recliner for a vehicle, in which it is easy to assemble and is possible to minimize a clearance.

Description of the Related Art

A vehicle seat includes a seat back for supporting the upper body of the passenger, a seat cushion for supporting the lower body such as the buttocks and thighs, and a headrest for supporting the back of the head. A recliner is provided between a seat cushion and a seat back of a vehicle to release a lock for reclining the seat back if necessary, and to lock the seat back after reclining for maintaining the angle thereof.

The reclining device is divided into a manual-type reclining device, in which the angle of the seat back is adjusted by the passenger manipulating a lever, and a power-type reclining device, which is automatically operated by the power of a motor through manipulating a switch.

The foregoing is intended merely to aid in the understanding of the background of the present invention, and is not intended to mean that the present invention falls within the purview of the related art that is already known to those skilled in the art.

SUMMARY

One aspect of the present invention provides a seat recliner for a vehicle, in which it is easy to assemble and is possible to minimize a clearance.

Another aspect of the invention provides a seat recliner for a vehicle, the seat recliner including: a first flange provided with a plurality of guide parts being spaced apart from each other, with guide spaces defined between the guide parts; a plurality of locking gears disposed in the guide spaces of the first flange respectively, configured to slide forward and backward along the guide parts in a radial direction, and provided with external teeth at an outer end of each of the locking gears; and a second flange coupled with the first flange to be rotatable relative thereto, formed in a shape covering the guide parts and the locking gears, and configured to be engaged with the external teeth of the locking gears, wherein the locking gears slide while opposite sides of each of the locking gears come into contact with sides of the corresponding guide parts that are assembled therewith, and a recessed assembly guide, is provided on a part of each side of the guide parts or the locking gears such that each of the locking gears is guided between the corresponding guide parts through the assembly guide.

Each side of the locking gears and the guide parts may be divided into an inner side and an outer side, the assembly guide may be provided on the inner side or the outer side of each of the locking gears and the guide parts, and in the assembled state of the locking gears with the guide parts, portions with the assembly guide may be spaced apart from each other, and portions without the assembly guide may come into surface contact with each other.

Each of the locking gears may be configured such that a width between the inner side and an opposite inner side is smaller than a width between the outer side and an opposite outer side, and the inner side and the outer side of each of the guide parts may be configured such that the guide spaces correspond to a shape of the locking gears.

The inner side of each of the locking gears may be formed in a flat surface, and the inner side of each of the guide parts may be provided with the assembly guide.

The assembly guide of each of the guide parts may be formed at an outermost end of the inner side through which each of the locking gears firstly enters when being assembled.

The inner side of each of the guide parts may be formed in a flat surface except the assembly guide so as to come into surface contact with the inner side of each of the locking gears.

The assembly guide of each of the guide parts may be formed to have a length that avoids overlapping with an innermost end of the inner side of each of the locking gears when the locking gears slide in forward and backward directions in an assembled state.

The outer side of each of the guide parts may be formed in a flat surface, and the outer side of each of the locking gears may be provided with the assembly guide.

The assembly guide of each of the locking gears may be formed at an innermost end of the outer side which each of the locking gears firstly encounters when being assembled.

The outer side of each of the locking gears may be formed in a flat surface except the assembly guide so as to come into surface contact with the outer side of each of the guide parts.

The assembly guide of each of the locking gears may be formed to have a length that avoids overlapping with an outermost end of the outer side of each of the guide parts when the locking gears slide in forward and backward directions in an assembled state.

The opposite sides of each of the locking gears may be parallel and symmetrical to each other, and opposed sides of each of the guide parts may be parallel and symmetrical to each other.

A portion between the assembly guide and an area other than the assembly guide may be rounded.

According to the seat recliner for a vehicle of embodiments of the present invention, it is easy to assemble and is possible to minimize a clearance.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF EMBODIMENTS

Hereinbelow, embodiments of the present invention will be described in more detail with reference to the accompanying drawings.

Generally, a recliner is configured such that a first flange is fixed, a second flange is relatively rotated, and a locking gear is provided thereinside, whereby when the locking gear is engaged with the second flange, the locking is performed, and when the locking gear is disengaged therefrom, the second flange is relatively rotated on the first flange, such that the seat back is reclined with respect to the seat cushion.

In a typical recliner, in order to assemble the locking gear in the recliner, a slight clearance has to be designed between the locking gear and opposite guide parts, and the reduced clearance may decrease assemblability. Accordingly, there are needs for a recliner, in which it is easy to assemble even if there is no or minimized clearance and the operability of the product is guaranteed even if a clearance is removed.

Figure 1:
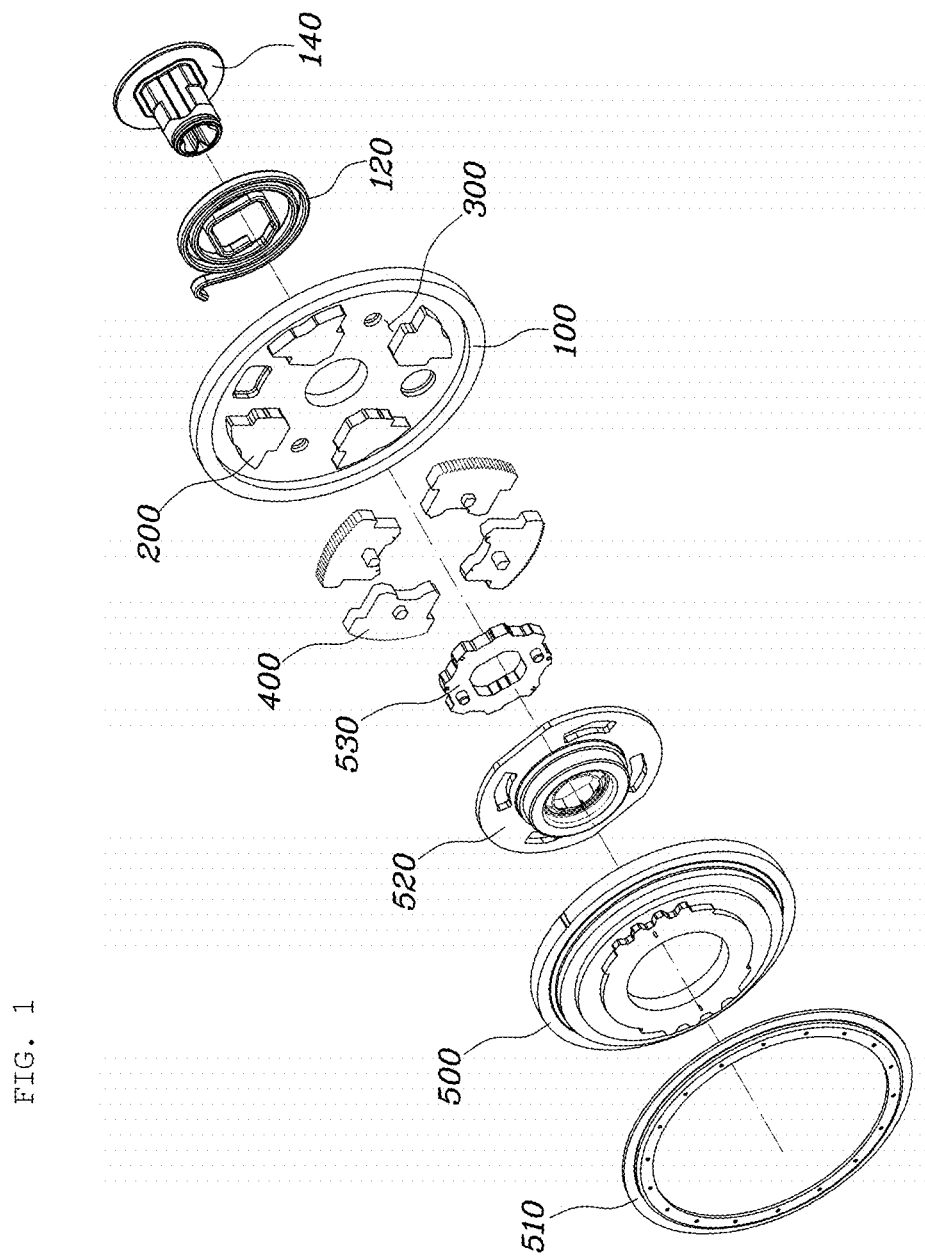
FIG. 1 is an exploded perspective view showing a seat recliner for a vehicle according to an embodiment of the present invention.
Figure 2:
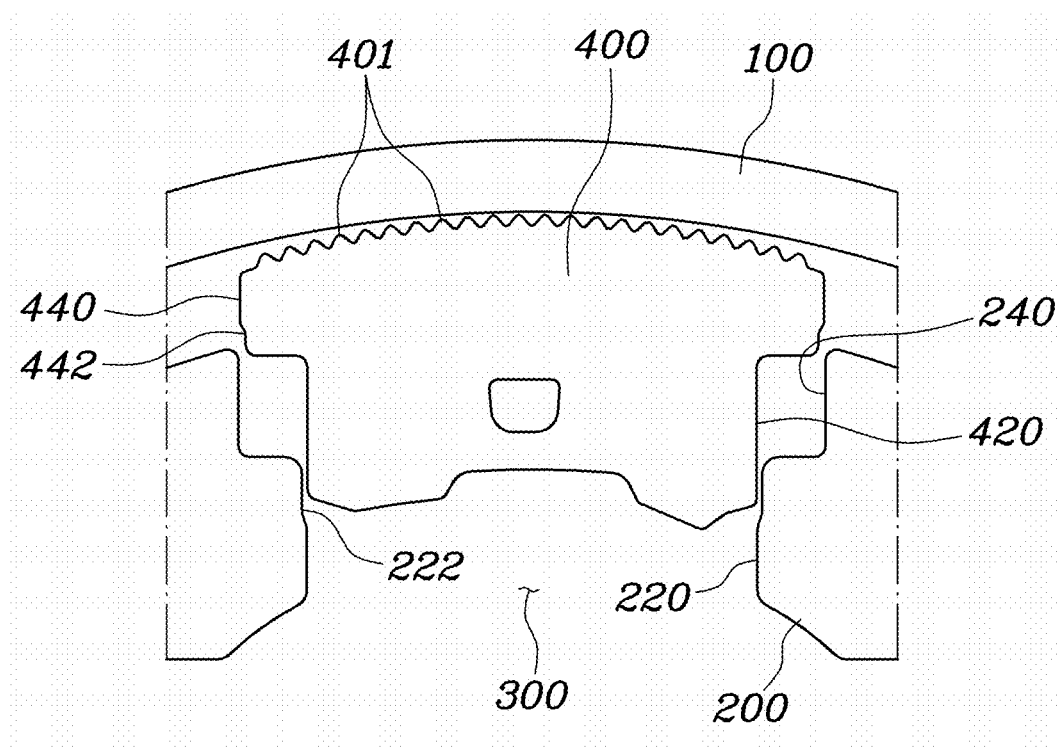
FIG. 2 is a view showing a process of assembling the seat recliner for a vehicle according to the embodiment of the present invention.
Figure 3:
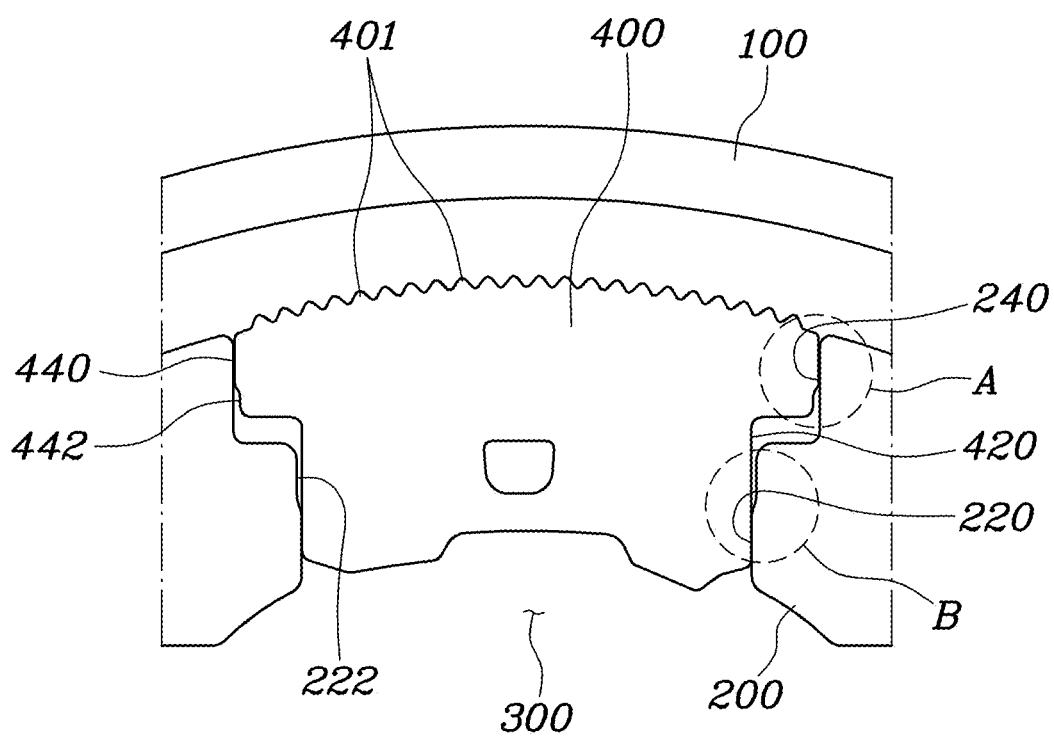
FIG. 3 is an assembled view showing the seat recliner for a vehicle according to the embodiment of the present invention.
Figure 4:
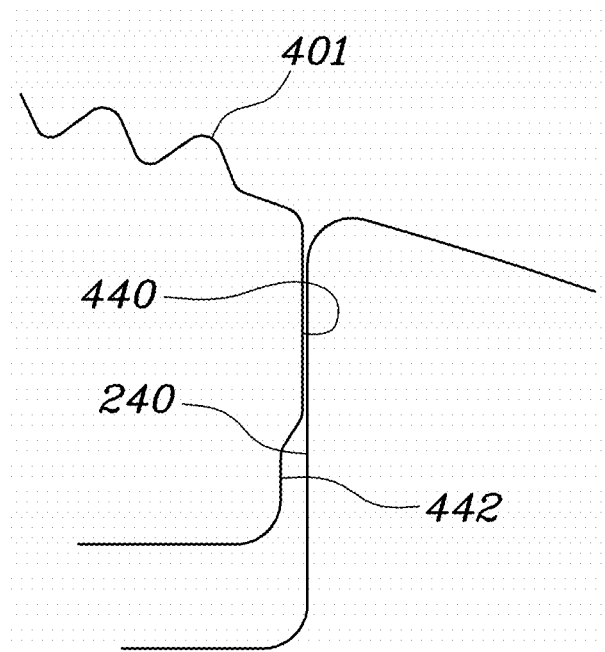
FIGS. 4 to 5 are detailed views showing the assembled state of FIG. 3.
Figure 5:
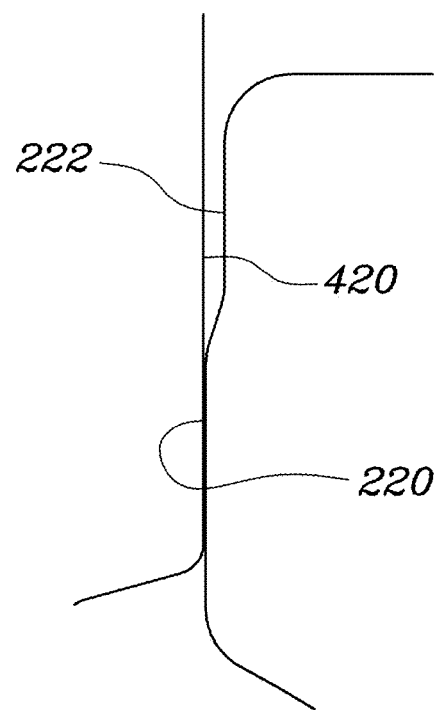

FIG. 1 is an exploded perspective view showing a seat recliner for a vehicle according to an embodiment of the present invention; FIG. 2 is a view showing a process of assembling the seat recliner for a vehicle according to the embodiment of the present invention; FIG. 3 is an assembled view showing the seat recliner for a vehicle according to the embodiment of the present invention; and FIGS. 4 to 5 are detailed views showing the assembled state of FIG. 3.

FIG. 1 is an exploded perspective view showing a seat recliner for a vehicle according to an embodiment of the present invention, wherein the seat recliner for a vehicle according to embodiments of the present invention includes: a first flange 100 provided with a plurality of guide parts 200 being spaced apart from each other, with guide spaces 300 provided between the guide parts 200; a plurality of locking gears 400 disposed in the guide spaces of the first flange 100 respectively, configured to slide forward and backward along the guide parts 200 in a radial direction, and provided with external teeth at an outer end of each of the locking gears; and a second flange 500 coupled with the first flange 100 to be rotatable relative thereto, formed in a shape covering the guide parts 200 and the locking gears 400, and provided with internal teeth on an inner circumferential surface thereof to be engaged with the external teeth of the locking gears 400, wherein the locking gears 400 slide while opposite sides of each of the locking gears come into contact with sides of the corresponding guide parts 200 that are assembled therewith, and a recessed assembly guide 222, 442 is provided on a part of each side of the guide parts 200 or the locking gears 400 such that each of the locking gears 400 is guided between the corresponding guide parts 200 through the assembly guide 222, 442.

Further, a cam 530 is mounted in the center of the plurality of locking gears 400, wherein the cam 530 controls forward and backward motions of the locking gears 400 while being rotated. Since the cam 530 is engaged with a controller 520, the cam is rotated by the controller 520, and simultaneously, the controller 520 guides forward and backward motions of each of the locking gears 400. After the second flange 500 is coupled to the first flange 100, a retainer 510 maintains the coupling therebetween. A spring 120 and a cap 140 are coupled to the outer side of the first flange 100, and the spring 120 restores the controller 520 and the cam 530. By the above configuration, the recliner is operated in such a manner that when the locking gears 400 are moved backward, the engagement with the internal teeth of the second flange 500 is released to perform unlocking, and when the locking gears 400 are moved forward by the spring 120 to be engaged with the second flange 500 again, the relative rotation with the first flange 100 is locked, whereby the angle of the seat is maintained.

As described above, the locking gears 400 repeat engagement and release in the guide spaces 300 formed between the guide parts 200 of the first flange 100 while repeatedly moving forward and backward, wherein when initially assembling the recliner, the locking gears 400 are assembled by being inserted between the guide parts 200 on the first flange 100 as shown in FIG. 2. Accordingly, in a typical recliner, to facilitate this assembly in the factory, the shape is designed and manufactured from the design stage so as to establish a fine clearance for assembly between the side of the locking gear and the side of the guide part. However, since the fine clearance between the locking gear and the guide part is provided at each position between the plurality of locking gears and the guide parts, a significant clearance rather than fine clearance has occurred overall in the operating conditions of the final product, which causes rattling or second flange shaking after locking.

In embodiments, the recliner is configured such that the assembly guide 222, 442 is provided at a predetermine portion of each of the locking gears 400 or the guide parts 200 to give a clearance when assembled, and a remaining portion without the assembly guide 222, 442 comes into surface contact with another remaining portion, thereby ensuring that there is no clearance in the operating section.

To be more specific, the locking gears 400 slide while opposite sides of each of the locking gears come into contact with sides of the corresponding guide parts 200 that are assembled therewith. Herein, the recessed assembly guide 222, 442 is famed on a part of each side of the guide parts 200 or the locking gears 400. When the locking gears 400 is initially assembled on the first flange 100 by the assembly guide 222, 442, the locking gear 400 can be smoothly guided between the guide parts 200 through the assembly guide 222, 442 and assembled. Further, after assembly, at portions except the assembly guide 222, 442, the locking gear 400 and the guide parts 200 come into surface contact with each other, thereby ensuring that there is no clearance in the operating section.

FIG. 2 is a view showing a process of assembling the seat recliner for a vehicle according to the embodiment of the present invention; FIG. 3 is an assembled view showing the seat recliner for a vehicle according to the embodiment of the present invention; FIG. 4 is a detailed view showing an area A of FIG. 3; and FIG. 5 is a detailed view showing an area B of FIG. 3.

To be more specific, each side of the locking gears 400 and the guide parts 200 is divided into an inner side 220, 420 and an outer side 240, 440. Further, the assembly guide 222, 442 is provided on the inner side 220, 420 or the outer side 240, 440 of each of the locking gears 400 and the guide parts 200. Further, in the assembled state of the locking gears 400 with the guide parts 200, portions with the assembly guide 222, 442 are spaced apart from each other, and portions without the assembly guide 222, 442 come into surface contact with each other.

Each of the locking gears 400 may be configured such that a width between the inner sides 420 is smaller than a width between the outer sides 440, and the inner side 220 and the outer side 240 of each of the guide parts 200 may be configured such that the guide spaces 300 correspond to a shape of the locking gears 400. This allows the locking gears 400 to have a wider gear range at the outermost area, and as a result, the retention force of the recliner is improved.

Further, the inner side 420 of each of the locking gears 400 may be formed in a flat surface, and the inner side 220 of each of the guide parts 200 may be provided with the assembly guide 222. In particular, the assembly guide 222 of each of the guide parts may be formed at an outermost end of the inner side 220 through which each of the locking gears 400 firstly enters when being assembled. Thereby, as shown in FIGS. 2 to 3, when the locking gears 400 are assembled while sliding backward, the inner side 420 of the locking gear 400 is guided by the assembly guide 222 of the guide part 200 to be easily inserted into the guide space 300.

Further, the inner side 220 of each of the guide parts 200 may be famed in a flat surface except the assembly guide 222 so as to come into surface contact with the inner side 420 of each of the locking gears 400. Thereby, there is no clearance in the operating section, and as shown in FIG. 3, in the locked state, even if the locking gears 400 themselves are subjected to a torque due to the load of the seat, the innermost end of each of the locking gears 400 is flat, so that it comes into surface contact with the guide part 200 and can be firmly locked.

In particular, the assembly guide 222 of each of the guide parts 200 may be formed to have a length that avoids overlapping with an innermost end of the inner side 420 of each of the locking gears 400 when the locking gears 400 slide in forward and backward directions in the assembled state. In other words, even if the locking gears 400 are fully moved forward to be engaged with the second flange 500 and locked, as shown in FIG. 3, the innermost end of the inner side 420 of each of the locking gears 400 is still in surface contact with the inner side 220 of each of the guide parts 200 and is not overlapped with the assembly guide 222 of each of the guide parts 200, there is no shaking in the locked state.

Meanwhile, the outer side 240 of each of the guide parts 200 may be formed in a flat surface, and the outer side 440 of each of the locking gears 400 may be provided with the assembly guide 442. As shown in FIGS. 2 and 4, the assembly guide 442 of each of the locking gears 400 may be formed at an innermost end of the outer side 440 which each of the locking gears 400 firstly encounters when being assembled. Thereby, the locking gears 400 are guided from the beginning when assembled.

Further, the outer side 440 of each of the locking gears 400 may be foamed in a flat surface except the assembly guide 442 so as to come into surface contact with the outer side 240 of each of the guide parts 200. Thereby, there is no clearance in the operating section after assembly. Further, the assembly guide 442 of each of the locking gears 400 may be formed to have a length that avoids overlapping with an outermost end of the outer side 240 of each of the guide parts 200 when the locking gears 400 slide in forward and backward directions in the assembled state. Thereby, even if the locking gears 400 are fully moved forward to be engaged with the second flange 500 and locked, as shown in FIG. 3, the outermost end of the outer side 240 of each of the guide parts 200 is still in surface contact with the outer side 440 of each of the locking gears 400 and is not overlapped with the assembly guide 442 of each of the locking gears 400, and the locking gears 400 are supported not to shake in the locked state.

Further, opposite sides of the locking gear 400 may be parallel and symmetrical to each other, and opposite sides of the guide part 200 may be parallel and symmetrical to each other. Thereby, the locking gears 400 are in vertical motion and the locking gears 400 and guide parts 200 are able to maintain surface contact with each other in all areas except the assembly guide 222, 442.

Meanwhile, a portion between the assembly guide 222, 442 and an area other than the assembly guide may be rounded. Thereby, when assembling the locking gears 400, the locking gears 400 can be smoothly inserted and assembled at the connecting points between the assembly guide 222, 442 and the areas other than the assembly guide, thereby preventing the stress concentration in the transition area.

According to the seat recliner for a vehicle of embodiments of the present invention, it is easy to assemble, and also is possible to minimize a clearance.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A seat recliner for a vehicle, the seat recliner comprising:
   a first flange provided with a plurality of guide parts being spaced apart from each other, with guide spaces defined between the guide parts;
   a plurality of locking gears disposed in the guide spaces of the first flange respectively, configured to slide forward and backward along the guide parts in a radial direction, and provided with external teeth at an outer end of each of the locking gears; and
   a second flange coupled with the first flange to be rotatable relative thereto, formed in a shape covering the guide parts and the locking gears, and configured to be engaged with the external teeth of the locking gears,
   wherein the locking gears are configured to slide while opposite sides of each of the locking gears come into contact with sides of the corresponding guide parts that are assembled therewith, wherein a recessed assembly guide is provided on a part of each side of the guide parts or the locking gears such that each of the locking gears is guided between the corresponding guide parts through the assembly guide,
   wherein each side of the locking gears and the guide parts is divided into a first portion and a second portion, wherein the first portion is located closer to the center of the first flange than the second portion,
   wherein the assembly guide is provided on the first portion or the second portion of each side of the locking gears and the guide parts, and
   wherein, in an assembled state of the locking gears with the guide parts, portions with the assembly guide are spaced apart from each other,
   wherein the first portion of each side of the locking gears is formed in a flat surface,
   wherein the first portion of each side of the guide parts is provided with the assembly guide.

2. The seat recliner of claim 1, wherein each of the locking gears is configured such that a width between the first portion and an opposite first portion is smaller than a width between the second portion and an opposite second portion, and
   the first portion and the second portion of each side of the guide parts are configured such that the guide spaces correspond to a shape of the locking gears.

3. The seat recliner of claim 1, wherein the assembly guide of each of the guide parts is formed at an outermost end of the first portion through which each of the locking gears firstly enters when being assembled.

4. The seat recliner of claim 1, wherein the first portion of each side of the guide parts is formed in a flat surface except the assembly guide so as to come into surface contact with the first portion of each of the locking gears.

5. The seat recliner of claim 1, wherein the assembly guide of each of the guide parts is formed to have a length that avoids overlapping with an innermost end of the first portion of each of the locking gears when the locking gears slide in forward and backward directions in an assembled state.

6. The seat recliner of claim 2, wherein the second portion of each of the guide parts is formed in a flat surface, and the second portion of each of the locking gears is provided with the assembly guide.

7. The seat recliner of claim 6, wherein the assembly guide of each of the locking gears is formed at an innermost end of the second portion which each of the locking gears firstly encounters when being assembled.

8. The seat recliner of claim 6, wherein the second portion of each of the locking gears is formed in a flat surface except the assembly guide so as to come into surface contact with the second portion of each of the guide parts.

9. The seat recliner of claim 6, wherein the assembly guide of each of the locking gears is formed to have a length that avoids overlapping with an outermost end of the second portion of each of the guide parts when the locking gears slide in forward and backward directions in an assembled state.

10. The seat recliner of claim 1, wherein the opposite sides of each of the locking gears are parallel and symmetrical to each other, and opposed sides of each of the guide parts are parallel and symmetrical to each other.

11. The seat recliner of claim 1, wherein a portion between the assembly guide and an area other than the assembly guide is rounded.

* * * * *